3,481,957
NOVEL ANDROSTANE AND 19-NORANDRO-
STANE STEROIDAL ESTERS AND THEIR
PREPARATION
Alexander D. Cross, Mexico City, Mexico, and John H.
Fried, Palo Alto, Calif., assignors to Syntex Corporation, Panama, Panama, a corporation of Panama
No Drawing. Filed Sept. 7, 1967, Ser. No. 665,997
Int. Cl. C07c 169/22, 167/28; A61k 27/00
U.S. Cl. 260—397.4
21 Claims

ABSTRACT OF THE DISCLOSURE

Bicyclo[2.2.2]octane - 1 - carboxylate, bicyclo[2.2.2]octane - 1 - methylenecarbonate, and tricyclo[3.3.1.1$^{1,5}$]decane-1-methylenecarbonate esters of androstane and 19-norandrostane steroids which esters are useful for their long-acting antifertility and progestational activity and processes for the preparation of these novel esters.

---

This invention relates to new and useful steroid esters. It more specifically pertains to novel and useful steroidal bicyclo[2.2.2]octane-1-carboxylate, bicyclo[2.2.2]octane-1-methylenecarbonate, and tricyclo[3.3.1.1$^{1,5}$]decane-1-methylenecarbonate esters as well as various molecularly modified derivatives thereof, the steroid nucleus thus bearing a novel group represented by the Formulas A, B, and C:

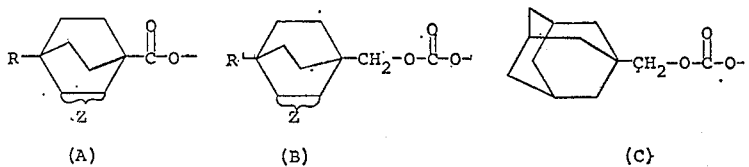

wherein, in each applicable formula, R is hydrogen, chloro, fluoro, trifluoromethyl, cyano, (lower)alkyloxy, acyloxy, (lower)alkyloxymethyl, acyloxymethyl, (lower)alkyl· or aryl; R' is identical in meaning to R, exclusive of cyano, acyloxy, and acyloxymethyl; and Z is a carbon-carbon single bond or a carbon-carbon double bond.

The novel steroid esters of the present invention are of the androstane and 19-norandrostane series and are represented by the following Formula I:

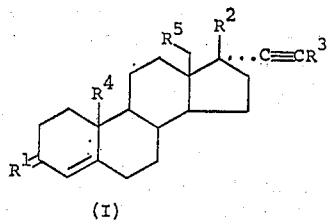

wherein R$^1$ is an oxygen atom or the group $$\underset{|\cdots\text{H}}{\text{R}^6}$$

in which R$^6$ is hydroxy and the conventional hydrolyzable esters thereof or a polycyclic group represented by one of the above Formulas A, B, and C;

R$^2$ is hydroxy and the conventional hydrolyzable esters thereof or a polycyclic group represented by one of the above Formulas A, B, and C;

R$^3$ is hydrogen, (lower)alkyl, or chloro;

R$^4$ is hydrogen or methyl; and

R$^5$ is hydrogen or (lower)alkyl;

one of R$^2$ and R$^6$ being said polycyclic group.

The terms "(lower)alkyl" and derivations thereof appearing in the above definitions and elsewhere in the instant specification denote alkyl groups containing from 1 to 6 carbon atoms, inclusive, such as methyl, ethyl, propyl, isopropyl, butyl, isobutyl, t-butyl, pentyl, amyl, hexyl, and the like.

The terms "conventional hydrolyzable ester" as used herein denotes those hydrolyzable ester groups conventionally employed in the steroid art, preferably, those derived from hydrocarbon carboxylic acids or phosphoric acids and their salts. The term "hydrocarbon carboxylic acid" defines both substituted and unsubstituted hydrocarbon carboxylic acids. These acids can be completely saturated or possess varying degrees of unsaturation (including aromatic), can be of straight chain, branched chain, or cyclic structure, and preferably contain from 1 to 12 carbon atoms. In addition, they can be substituted by functional groups, for example, hydroxy, alkoxy containing up to 6 carbon atoms, acyloxy containing up to 12 carbon atoms, nitro, amino, halogeno, and the like, attached to the hydrocarbon backbone chain. Typical conventional hydrolyzable esters thus included within the scope of the term and the instant invention are acetate, propionate, butyrate, valerate, caproate, enanthate, caprylate, pelargonate, acrylate, undecenoate, phenoxyacetate, benzoate, phenylacetate, diphenylacetate, diethylacetate, trimethylacetate, t-butylacetate, trimethylhexanoate, methylneopentylacetate, cyclohexylacetate, cyclopentylpropionate, adamantoate, glycolate, methoxyacetate, hemisuccinate, hemiadipate, hemi-β,β-dimethylglutarate, acetoxyacetate, 2-chloro-4-nitrobenzoate, aminoacetate, diethylaminoacetate, piperidinoacetate, β-chloropropionate, trichloroacetate, β-chlorobutyrate, dihydrogen phosphate, dibenzyl phosphate, benzyl hydrogen phosphate, sodium benzyl phosphate, cyclohexylammonium benzyl phosphate, sodium phenyl phosphate, sodium ethyl phosphate, di-p-nitrobenzyl phosphate, sodium o-methoxyphenyl phosphate, cyclohexylammonium p-cyanobenzyl phosphate, sodium phenacyl phosphate, benzyl o-carbomethoxyphenyl phosphate, and the like.

Thus included within the scope of the present invention are the novel steroid esters represented by the following Formulas I-a, I-b, I-c, I-d, I-e, and I-f:

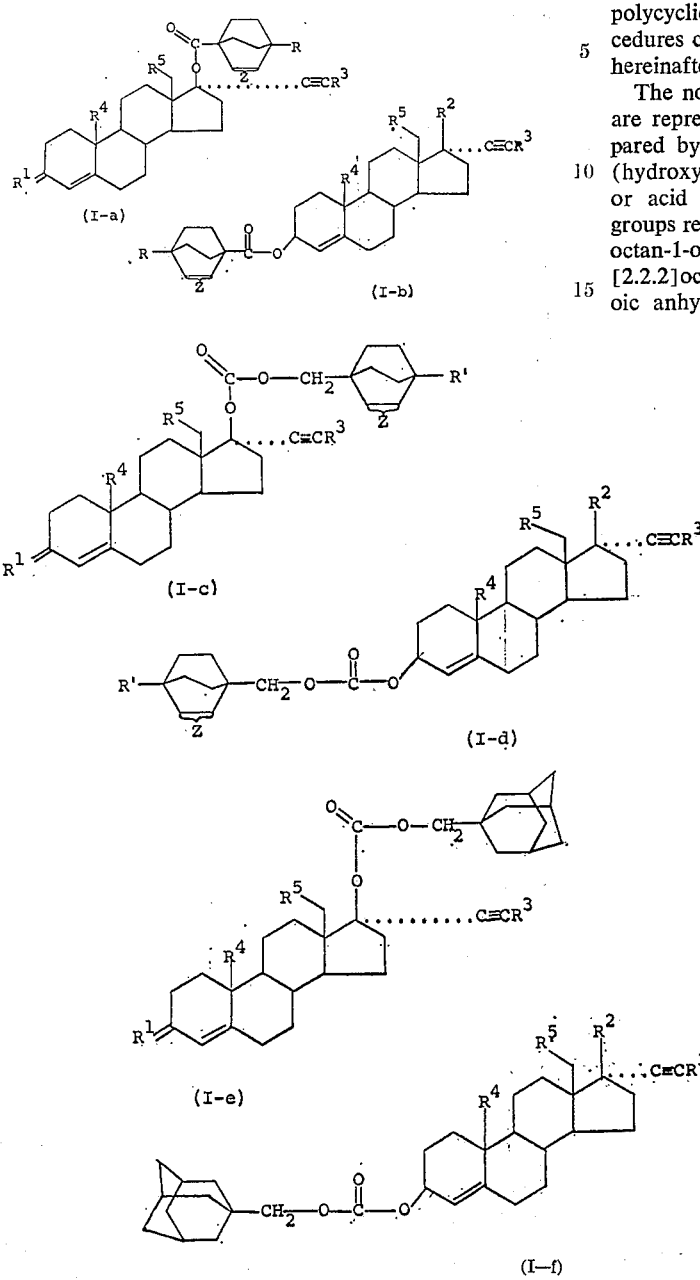

R⁵, and Z is as hereinbefore defined.

It will be understood that the above represented compounds and the scope of the instant invention include the corresponding novel steroidal C–3,17 bisesters.

The novel polycyclic esters of this invention possess enhanced and long acting anti-fertility and progestational activity. They are accordingly useful in the control and regulation of fertility and the management of various menstrual disorders.

These compounds are administered via the usual routes, whether orally or parenterally, either singly, in conjunction with other medicinal agents, or in pharmaceutically acceptable non-toxic compositions formed by the incorporation of any of the normally employed excipients. Dosage levels vary according to the particular affliction or condition being treated, its degree or severity, and the observed response to treatment, but generally a daily rate of from .01 mg. of 1 mg. per kilogram of body weight is satisfactory.

wherein, in each formula, each of R, R', $R^1$, $R^2$, $R^3$, $R^4$,

The novel steroid esters of the present invention are prepared via usual esterification reaction union of the polycyclic moiety with the steroid moiety, the specific procedures conditioned upon the particular ester prepared as hereinafter set forth in more detail.

The novel estrogen steroid bicyclic esters hereof which are represented above by Formulas I–a and I–b are prepared by esterifying the corresponding steroidal alcohol (hydroxy at C–3 and/or C–17) either with the acid halide or acid anhydride which otherwise correspond to the groups represented by Formula A, that is, a bicyclo[2.2.2]octan-1-oic acid halide (preferably, chloride), a bicyclo[2.2.2]octan-1-oic anhydride (preferably, (lower)alkanoic anhydride), or the corresponding C–2 unsaturated and/or C–4 substituted derivatives thereof. Alternatively, the acid per se or the esters thereof can be so employed.

In the practice of the preferred aspects of the above preparation, the reaction is conducted in the presence of base, such as is provided by an organic tertiary amine, for example, triethylamine, pyridine, and the like. The reaction is also conducted with an inert solvent, such as dioxane, tetrahydrofuran, diethyl ether, benzene, xylene, and the like with the reaction being carried out at temperatures of from about 0° C. to about 100° C. or higher upwards of 150° C. Temperatures below 0° C. may be employed depending mainly upon reactants and reaction choice.

The novel mono ester is introduced at C–17 by esterifying the 3-keto-Δ⁴-17-hydroxy compound by the above procedure. Thereafter, the 3β-hydroxyl can be conventionally obtained by reduction of the keto function and then esterified to furnish the corresponding mixed ester derivatives.

The novel mono ester at C–3 is conveniently prepared by reduction of the 3-keto group, such as with sodium borohydride, and esterification of the resultant 3-hydroxy group via the foregoing procedure at about room temperature. Alternatively, a protective ether group at C–17 can be utilized during the esterification and removed by mild acid hydrolysis.

The corresponding mixed esters are prepared by conventionally esterifying any remaining hydroxy group after the principal reaction by which the novel esters hereof are produced to the desired and appropriate conventional hydrolyzable ester via known procedures.

The bicyclo[2.2.2]octane- and bicyclo[2.2.2]oct-2-ene-1-carboxylic acid halides and anhydrides corresponding to Formula A are prepared from the corresponding free acid compounds by methods known per se as described, for example, in Wagner and Zook, Synthetic Organic Chemistry, John Wiley and Sons, Inc., New York (1953), p. 546 et. seq. and p. 558 et. seq., respectively.

The corresponding free carboxylic acid compounds from which the acid halides and acid anhydrides are formed are also prepared by known methods. One such method involves treating a 4-substituted or -unsubstituted cyclohexa-1,3-diene-1-carboxylic acid or -1-carboxylate by the Diels-Alder addition of ethylene, such as according to the conditions set forth in U.S. Patent 3,081,334 to afford the corresponding 4-substituted or -unsubstituted bicyclo[2.2.2]octane-1-carboxylic acids. Thereafter, the thus obtained saturated acids can be dehydrogenated to the corresponding 4-substituted or -unsubstituted bicyclo [2.2.2]oct-2-ene-1-carboxylic acids. Other suitable methods for preparing these acids are set forth by Holtz et al., J. Am. Chem. Soc. 86, 5183 (1964); Kauer et al., J. Org. Chem. 30, 1431 (1965); Grob et al., Helv. Chim. Acta. 41, 1191 (1958); Roberts et al., J. Am. Chem. Soc. 75, 637 (1953); Belgium Patent 665,701; and Netherlands Patent 6507979.

The novel androstane and 19-norandrostane steroid bicyclocarbonate esters hereof which are represented above by Formulas I–c and I–d are prepared analogously to the methods operable for the preparation of the compounds of Formulas I–a and I–b as set forth above utilizing, instead, the appropriate steroidal alcohol with the chlorocarbonate (chloroformate) which otherwise corresponds to the groups represented by Formula B, that is, a bicyclo[2.2.2]octane-1-methylenechlorocarbonate or the corresponding C–2 unsaturated and/or C–4 substituted derivatives thereof.

The chlorocarbonate reactants are conveniently prepared via known procedures. First, the corresponding free carboxylic acid compound (obtained as set forth above) is conventionally reduced such as with a metal hydride, for example, lithium aluminum hydride, and the like, in inert solvent and the resultant alcohol (methylol) treated with phosgene such as according to the procedure described in Wagner and Zook, op. cit., p. 483 et seq.

The novel androstane and 19-norandrostane steroid tricycliccarbonate esters hereof which are represented above by Formulas I–e and I–f are prepared analagously to the methods set forth above for the preparation of the bicycliccarbonate esters with the substitution of the corresponding tricyclicchlorocarbonate (chloroformates) which otherwise corresponds to the group represented by Formula C above, namely tricyclo[3.3.1.1$^{1,5}$] decane-1-methylenechlorocarbonate, in lieu of the bicyclo derivatives.

This tricyclicchlorocarbonate compound is similarly prepared from tricyclo[3.3.1.1$^{1,5}$]decane-1-carboxylic acid, otherwise referred to as adamantane-1-carboxylic acid, upon conventional reduction as described above giving the corresponding alcohol (methylol) derivative followed by treatment thereof with phosgene as likewise mentioned supra.

The steroidal alcohol starting compounds are known in the art or can be prepared via processes known per se.

Thus, the $\Delta^4$-androstanes and 19-nor-$\Delta^4$androstanes bearing keto groups at positions C–3 and C–17 are preferably used to prepare the other starting compounds hereof. In the introduction of the 17α-alkynyl substituents, the $\Delta^4$-3,17-dione or 19-nor-$\Delta^4$-3,17-dione is converted to the corresponding 3-enol ether such as by reaction with ethyl orthoformate in organic solution. Thereafter, the 17-keto group of the thus prepared enol ether is elaborated by treatment thereof with an organo-metallic reagent, such as an alkynyl lithium or alkynyl magnesium halide which provides the corresponding 17α-alkynyl-17β-ol compounds. The 17α-chloroethynyl is introduced by treating the 17-keto derivative with 1,2-dichloroethylene in the presence of methyl lithium. The 17α-(lower)alkyl substituted alkynyl groups are analogously inserted using the corresponding (lower)alkyl substituted starting compounds. Further elaboration is as discussed above.

The examples which follow are intended to merely illustrate the manner by which this invention can be practiced and therefore are not to be construed as limitations upon the overall scope hereof.

EXAMPLE 1

A mixture of 2.5 g. of 17α-ethynylandrost-4-en-17β-ol-3-one in 15 ml. of pyridine containing 4.0 g. of bicyclo-[2.2.2]octane-1-carboxylic acid chloride is heated at steam bath temperature for about two hours. The mixture is then poured into ice water and the solid which forms collected by filtration, washed with water, and dried yielding 17α - ethynyl-17β-(bicyclo[2.2.2]octane-1'-carbonyloxy)-androst-4-en-3-one.

In a similar manner, the following compounds are prepared from the requisite starting compounds:

17α-ethynyl-17β-(bicyclo[2.2.2]octane-1'-carbonyloxy)- 19-norandrost-4-en-3-one,
17α-chloroethynyl-17β-(bicyclo[2.2.2]octane-1'-carbonyloxy)-androst-4-en-3-one,
17α-chloroethynyl-17β-(bicyclo[2.2.2]octane-1'-carbonyloxy)-19-norandrost-4-en-3-one,
17α-propynyl-17β-(bicyclo[2.2.2]octane-1'-carbonyloxy)-androst-4-en-3-one, and
17α-propynyl-17β-(bicyclo[2.2.2]octane-1'-carbonyloxy)- 19-norandrost-4-en-3-one, as well as the corresponding 18-methyl derivatives thereof.

Upon substitution of the appropriate substituted acid chloride (as set forth in the third paragraph of Example 7) in lieu of bicyclo[2.2.2]octane-1-carboxylic acid chloride in the procedure set forth above in the instant example, the corresponding C–17 monoesters of the corresponding starting steroid hydroxy compounds hereof are prepared, such as 17α-ethynyl-17β-(4'-methylbicyclo[2.2.2]octane-1'-carbonyloxy)-19-norandrost-4-en-3-one,
17α-ethynyl-17β-(bicyclo[2.2.2]oct-2'-ene-1'-carbonyloxy)-19-norandrost-4-en-3-one,
17α-ethynyl-17β-(4'-methylbicyclo[2.2.2]oct-2'-ene-1'-carbonyloxy)-19-norandrost-4-en-3-one, as well as the corresponding 10-methyl derivatives thereof.

EXAMPLE 2

A solution of 1 g. of sodium borohydride in 3 ml. of water is added to an ice-cooled solution of 1 g. of 17α-ethynylandrost-4-en-17β-ol-3-one in 120 ml. of methanol and the mixture then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried, and evaporated to yield 17α-ethynylandrost-4-en-3β,17β-diol which may be further purified by recrystallization from acetone:hexane.

Upon subjecting the thus prepared derivative according to the procedure set forth in Example 1 above but conducting the reaction at 25° C., there is prepared 3β-(bicyclo[2.2.2]octane - 1' - carbonyloxy) - 17α - ethynylandrost-4-en-17β-ol.

Alternatively, the 17β-tetrahydropyranyloxy derivative can be so reduced and esterified. This protective ether grouping can be introduced and removed as follows: two milliliters of dihydropyran are added to a solution of 1 g. of 17α-ethynylandrost-4-en-17β-ol-3-one in 15 ml. of benzene. About 1 ml. is removed by distillation to remove moisture and 0.4 g. of p-toluenesulfonic acid is added to the cooled solution. This mixture is allowed to stand at room temperature for four days and is then washed with an aqueous sodium carbonate solution and water, dried, and evaporated. The residue is chromatographed on neutral alumina, eluting with hexane, to yield 17α-ethynyl-17β-tetrahydropyran-2'-yloxy-androst-4-en-3-one which is recrystallized from pentane.

To a solution of 1 g. of 3β-(bicyclo[2.2.2]octane-1'-carbonyloxy)-17α-ethynyl-17β-tetrahydropyran-2' - yloxy-androst-4-ene in 30 ml. of acetic acid is added 0.5 ml. of 2 N hydrochloric acid. The mixture is allowed to stand five hours at room temperature and then diluted with ice water and extracted with methylene chloride. The extracts are washed with water to neutrality, dried over sodium sulfate, and evaporated to dryness to yield 3β-(bicyclo[2.2.2]octane-1'-carbonyloxy) - 17α - ethynylandrost-4-en-17β-ol which is recrystallized from acetone:hexane.

Likewise, the corresponding 3β esters of the derivatives otherwise corresponding to those set forth in the second paragraph of Example 1 above are prepared.

Upon substitution of the appropriate substituted acid chloride (as set forth in the third paragraph of Example 7) in lieu of bicyclo[2.2.2]octane-1-carboxylic acid chloride in the procedure set forth above in the instant example, the corresponding C–3 monoesters of the corresponding starting steroid hydroxy compounds hereof are prepared, such as those corresponding to those of the last paragraph of Example 1.

EXAMPLE 3

Upon repeating the procedure of Example 1, substituting bicyclo[2.2.2]octane-1-methylenechlorocarbonate in lieu of bicyclo[2.2.2]octane-1-carboxylic acid chloride, there is obtained 17α-ethynyl-17β-(bicyclo[2.2.2]octane-1'-methylenecarbonyldioxy)androst-4-en-3-one.

In like manner, the corresponding 17β-carbonate of the other compounds set forth in the second paragraph of Example 1 above are prepared.

Upon substitution of the appropriate substituted chlorocarbonate reagent prepared as set forth in Example 8, infra., there are prepared the corresponding 17β-esters of the above compounds, such as those corresponding to those of the last paragraph of Example 1.

EXAMPLE 4

Upon repeating the procedure of Example 2, substituting bicyclo[2.2.2]octane-1-methylenechlorocarbonate in lieu of bicyclo[2.2.2]octane-1-carboxylic acid chloride, there is obtained 3β-(bicyclo[2.2.2]octane-1'-methylenecarbonyldioxy)-17α-ethynylandrost-4-en-17β-ol.

In like manner, the 3β-carbonates of the compounds otherwise corresponding to those set forth in the second paragraph of Example 1 above are prepared.

Upon substitution of the appropriate substituted chlorocarbonate reagent prepared as set forth in Example 8, infra., there are prepared the corresponding 3β-esters of the above compounds, such as those corresponding to those of the last paragraph of Example 1.

EXAMPLE 5

Upon repeating the procedure of Example 1, substituting tricyclo[3.3.1.1$^{1,5}$]decane-1 - methylenechlorocarbonate in lieu of bicyclo[2.2.2]octane-1-carboxylic acid chloride, there is obtained 17α-ethynyl-17β-(tricyclo[3.3.1.1$^{1,5}$]decane - 1' - methylenecarbonyldioxy)androst-4-en-3-one.

In like manner, the corresponding 17β-carbonate of the other compounds set forth in the second paragraph of Example 1 above are prepared.

EXAMPLE 6

Upon repeating the procedure of Example 2, substituting tricyclo[3.3.1.1$^{1,5}$]decane-1 - methylenechlorocarbonate in lieu of bicyclo[2.2.2]octane-1-carboxylic acid chloride, there is obtained 3β-(tricyclo[3.3.1.1$^{1,5}$]decane-1'-methylenecarbonyldioxy) - 17α - ethynylandrost-4-en-17β-ol.

In like manner, the 3β-carbonate of the compounds otherwise corresponding to those set forth in the second paragraph of Example 1 above are prepared.

EXAMPLE 7

A mixture of 10 g. of bicyclo[2.2.2]octane-1-carboxylic acid, 20 ml. of thionyl chloride in two drops of dimethylformamide, and about 40 ml. of benzene is heated at reflux temperature for about 2.5 hours. The resultant mixture is then fractionally distilled to give bicyclo[2.2.2]octane-1-carboxylic acid chloride.

A mixture of 15 g. of 4-methylbicyclo[2.2.2]oct-2-ene-1-carboxylic acid, 25 ml. of thionyl chloride, and a drop of dimethylformamide is heated at reflux temperature for about 1.5 hours. Fractional distillation of the reaction mixture gives 4-methylbicyclo[2.2.2]oct-2-ene-1-carboxylic acid chloride.

Similarly, upon the substitution of other bicyclo[2.2.2]octane - 1 - carboxylic acids and other bicyclo[2.2.2]-oct-2-ene-1-carboxylic acids in the procedures set forth in the immediately preceding two paragraphs, there is obtained the following corresponding acid chlorides:

bicyclo[2.2.2]oct-2-ene-1-carboxylic acid chloride,
4-methylbicyclo[2.2.2]octane-1-carboxylic acid chloride,
4-phenylbicyclo[2.2.2]oct-2-ene-1-carboxylic acid chloride,
4-phenylbicyclo[2.2.2]octane-1-carboxylic acid chloride,
4-n-propylbicyclo[2.2.2]octane-1-carboxylic acid chloride,
4-n-propylbicyclo[2.2.2]oct-2-ene-1-carboxylic acid chloride,
4-ethylbicyclo[2.2.2]octane-1-carboxylic acid chloride,
4-ethylbicyclo[2.2.2]oct-2-ene-1-carboxylic acid chloride,
4-benzylbicyclo[2.2.2]octane-1-carboxylic acid chloride,
4-chlorophenylbicyclo[2.2.2]octane-1-carboxylic acid chloride,
4-chlorobicyclo[2.2.2]octane-1-carboxylic acid chloride,
4-chlorobicyclo[2.2.2]oct-2-ene-1-carboxylic acid chloride,
4-fluorobicyclo[2.2.2]octane-1-carboxylic acid chloride,
4-fluorobicyclo[2.2.2]oct-2-ene-1-carboxylic acid chloride,
4-trifluoromethylbicyclo[2.2.2]octane-1-carboxylic acid chloride,
4-trifluoromethylbicyclo[2.2.2]oct-2-ene-1-carboxylic acid chloride,
4-cyanobicyclo[2.2.2]octane-1-carboxylic acid chloride,
4-cyanobicyclo[2.2.2]oct-2-ene-1-carboxylic acid chloride,
4-acetoxybicyclo[2.2.2]octane-1-carboxylic acid chloride,
4-acetoxybicyclo[2.2.2]oct-2-ene-1-carboxylic acid chloride,
4-methoxybicyclo[2.2.2]octane-1-carboxylic acid chloride,
4-methoxybicyclo[2.2.2]oct-2-ene-1-carboxylic acid chloride,
4-methoxymethylbicyclo[2.2.2]octane-1-carboxylic acid chloride,
4-methoxymethylbicyclo[2.2.2]oct-2-ene-1-carboxylic acid chloride, 4-acetoxymethylbicyclo[2.2.2]octane-1-carboxylic acid chloride, and
4-acetoxymethylbicyclo[2.2.2]oct-2-ene-1-carboxylic acid chloride.

EXAMPLE 8

A solution of 1 g. of sodium borohydride in 3 ml. of water is added to an ice-cooled solution of 1 g. of bicyclo[2.2.2]octane-1-carboxylic acid in 120 ml. of methanol and the mixture then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried, and evaporated to yield bicyclo[2.2.2]octane-1-methylol which may be further purified by recrystallization from acetone: hexane.

Bicyclo[2.2.2]octane-1-methylol (15.5 g.) is slowly added with stirring to 15 g. of liquid carbonyl chloride (phosgene) contained in a reaction vessel immersed in a Dry Ice-trichloroethylene bath. During the addition, the temperature of the carbonyl chloride solution is kept at or below 0° C. After the addition is complete, the temperature of the solution is allowed to slowly rise to room temperature. The mixture is maintained at room temperature with stirring for from 10 to 15 hours, steps being taken to remove expelled carbonyl chloride. Thereafter, the reaction mixture is distilled under reduced pressure to give bicyclo[2.2.2]octane-1-methylenechlorocarbonate.

Similarly, the above procedures can be used to prepare the other C-2 unsaturated and/or C-4 substituted analogs thereof otherwise corresponding to the derivatives set forth in the second paragraph of Example 7 above, with the exception of the 4-cyano, 4-acyloxy, and 4-acyloxymethyl derivatives.

EXAMPLE 9

The procedure set forth in Example 8 is repeated substituting tricyclo[3.3.1.1$^{1,5}$]decane-1-carboxylic acid (adamantane-1-carboxylic acid) for bicyclo[2.2.2]octane-1-carboxylic acid thus giving tricyclo[3.3.1.1$^{1,5}$]decane-1-methylol initially and tricyclo[3.3.1.1$^{1,5}$]decane-1-methylenechlorocarbonate as a final product.

EXAMPLE 10

To a mixture of 10 g. of bicyclo[2.2.2]octane-1-carboxylic acid in a solution consisting of 25 ml. of ether and 10 ml. of pyridine is added a cold ether solution containing the chemical equivalent of acetyl chloride. The reaction mixture is allowed to stand at 0° C. for four hours and the resultant precipitate removed by filtration. The solution is washed with 25 ml. of concentrated hydrochloric acid, ice water, a 7% sodium hydroxide solution and again ice water, the washed solution is dried at 0° C. over sodium sulfate, filtered, the ether evaporated to give bicyclo[2.2.2]octane-1-carboxylic acetyl anhydride which can be recrystallized from methanol.

Similarly, the other corresponding mixed anhydride starting compounds are analogously prepared.

These derivatives can be substituted for the corresponding acid chlorides employed in the foregoing examples with similar results.

The procedures contemplated in the following examples can be employed with both the androstane and 19-norandrostane series.

EXAMPLE 11

To a suspension of 1 g. of androst-4-ene-3,17-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water, and air dried to yield 3-ethoxyandrosta-3,5(6)-dien-17-one which is recrystallized from acetone:hexane.

A solution of 1 g. of 3-ethoxyandrosta-3,5(6)-dien-17-one in 30 ml. of anhydrous benzene is added under nitrogen to a solution of 1.4 g. of potassium in 30 ml. of t-amyl alcohol previously saturated with acetylene. A slow current of purified acetylene is continually passed through the solution for 40 hours. The mixture is diluted with water and extracted with benzene. These extracts are washed with water to neutrality, dried over sodium sulfate, and evaporated. Chromatography of the residue on alkaline alumina with 2:3 hexane:benzene yields 3-ethoxy-17α-ethynylandrosta-3,5(6)-dien-17β-ol which is recrystallized from acetone:hexane.

To a solution of 1 g. of 3-ethoxy-17α-ethynylandrosta-3,5(6)-dien-17β-ol in 10 ml. of acetone are added a few drops of 36% hydrochloric acid. The mixture is heated a few minutes at steam bath temperatures, diluted with water, and filtered. The solid thus collected is dried and recrystallized from acetone:hexane to yield 17α-ethynylandrost-4-en-17β-ol-3-one.

EXAMPLE 12

A solution of 8.5 g. of 1,2-dichloroethylene in 50 ml. of anhydrous ether is added in a dropwise fashion, under nitrogen and at 0° C., over a 30 minute period to a stirred solution of 15 ml. of 1.4 N methyl lithium in anhydrous ether. After stirring for an additional 90 minutes at room temperature, a solution of 0°.5 g. of 3-ethoxyandrosta-3,5(6)-dien-17-one in 20 ml. of anhydrous ether is added in a dropwise fashion with stirring over a 15 minute period. Stirring at room temperature is continued for 18 hours and the reaction mixture is then poured into ice water and extracted with ether. These extracts are washed with water, dried over sodium sulfate, and concentrated under reduced pressure. The residue is chromatographed on alkaline alumina with 8:2 hexane: ether to yield 3-ethoxy-17α-chloroethynyl-androsta- 3,5-(6)-dien-17β-ol which may be recrystallized from methanol.

Hydrolysis according to the procedure of the last paragraph of Example 1 gives the corresponding 3-keto-Δ$^4$ derivative, 17α-chloroethynylandrost-4-en-17β-ol-3-one.

EXAMPLE 13

The procedure of Example 12 is repeated substituting methylacetylene for acetylene to thus produce 3-ethoxy-17α-propynylandrosta-3,5(6)-dien-17β-ol.

Acid hydrolysis provides the corresponding 3-keto-Δ$^4$ derivative, 17α-propynylandrost-4-en-17β-ol-3-one.

Likewise, by substituting the appropriate alkylacetylene there are obtained the other corresponding 17α-alkynyl containing compounds.

As mentioned, the foregoing procedures are analogously utilized in the preparation of the corresponding 19-nor derivatives, as well as the corresponding 18-alkyl, such as 18-methyl, compounds.

EXAMPLE 14

A mixture of 1 g. of 3β-(bicyclo[2.2.2]octane-1'-carbonyloxy)-17α-ethynylandrost-4-en-17β-ol, 1 g. of p-toluenesulfonic acid monohydrate, 50 ml. of acetic acid, and 25 ml. of acetic anhydride is allowed to stand at room temperature for 24 hours and then is poured into water and stirred. This mixture is then extracted with methylene chloride and these extracts are dried and evaporated. The residue is then dissolved in 250 ml. of methanol containing 5 ml. of concentrated hydrochloric acid. After refluxing for one hour, the mixtures is neutralized with an aqueous 10% solution of potassium bicarbonate and evaporated. The residue is extracted with methylene chloride and the methylene chloride extract is washed with water to neutrality, dried, and evaporated to yield 3β-(bicyclo[2.2.2]octane-1'-carbonyloxy)-17α- ethynyl-17β-acetoxyandrost-4-ene which is recrystallized from acetone:ether.

In like manner, the corresponding 17β-acetates of the other 3β-esters prepared as set forth in Example 2 above are prepared.

EXAMPLE 15

The compound 17α-ethynyl-17β-(bicyclo[2.2.2]octane-1'-carbonyloxy)-androst-4-en-3-one is reduced in the manner described in the first paragraph of Example 2 yielding 17α-ethynyl-17β-(bicyclo[2.2.2]octane-1'-carbonyloxy)-androst-4-en-3β-ol.

A mixture of 1 g. of 17α-ethynyl-17β-(bicyclo[2.2.2]octane-1'-carbonyloxy)-androst-4-en-3β-ol, 4 ml. of pyridine, and 2 ml. of acetic anhydride is allowed to stand at room temperature for 15 hours. The mixture is then poured into ice water and the solid which forms is collected by filtration, washed with water, and dried to yield 3α - acetoxy - 17α - ethynyl - 17β - (bicyclo[2.2.2]octane-1'-carbonyloxy)-androst-4-ene which may be further purified through recrystallization from acetone:hexane.

In like manner, the corresponding 3β-acetates of the other 17β-esters as set forth in Example 1 above are prepared.

What is claimed is:

1. Compounds of the formula:

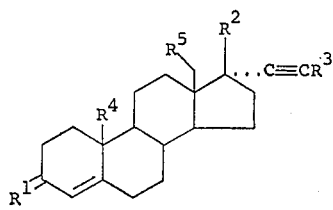

wherein $R^1$ is an oxygen atom or the group

in which $R^6$ is hydroxy and the conventional hydrolyzable esters thereof, or a polycyclic group represented by one of the formulas:

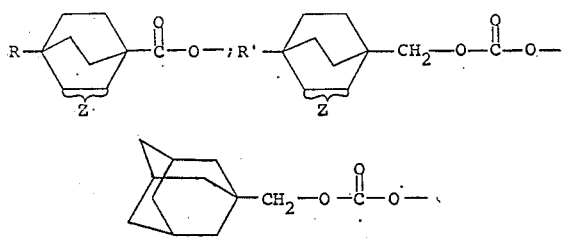

in which R is hydrogen, chloro, fluoro, trifluoromethyl, cyano, (lower)alkyloxy, acyloxy, (lower)alkyloxymethyl, acyloxymethyl, (lower)alkyl or aryl; R' is identical in meaning to R, exclusive of cyano, acyloxy, and acyloxymethyl; and Z is a carbon-carbon single bond or a carbon-carbon double bond;

$R^2$ is hydroxy and the conventional hydrolyzable esters thereof or a polycyclic group represented by one of the formulas:

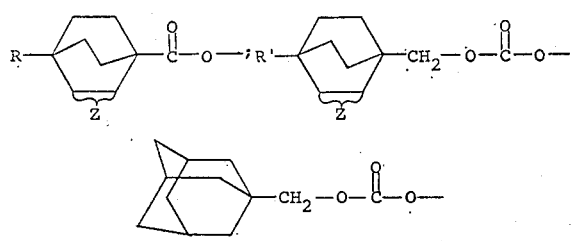

in which each of R, R' and Z is as already defined; $R^3$ is hydrogen, (lower)alkyl or chloro; $R^4$ is hydrogen or methyl; and $R^5$ is hydrogen or (lower)alkyl; one of $R^2$ and $R^6$ being said polycyclic group.

2. Compounds according to claim 1 wherein $R^1$ is an oxygen atom or the group

in which $R^6$ is acetoxy; $R^2$ is one of said polycyclic groups; $R^3$ is hydrogen, methyl, or chloro; $R^4$ is hydrogen or methyl; and $R^5$ is hydrogen or methyl.

3. A compound according to claim 1 wherein $R^1$ is an oxygen atom; $R^2$ is the group

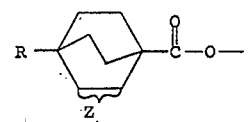

in which R is hydrogen; and Z is a carbon-carbon single bond; and each of $R^3$, $R^4$, and $R^5$ is hydrogen.

4. A compound according to claim 1 wherein $R^1$ is an oxygen atom; $R^2$ is the group

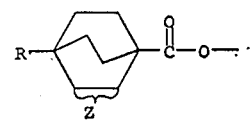

in which R is methyl; Z is a carbon-carbon single bond; and each of $R^3$, $R^4$, and $R^5$ is hydrogen.

5. A compound according to claim 1 wherein $R^1$ is an oxygen atom; $R^2$ is the group

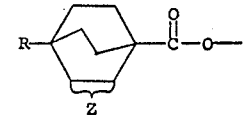

in which R is hydrogen; Z is a carbon-carbon double bond; and each of $R^3$, $R^4$, and $R^5$ is hydrogen.

6. A compound according to claim 1 wherein $R^1$ is an oxygen atom; $R^2$ is the group

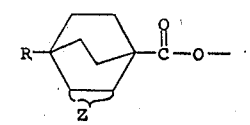

in which R is methyl; Z is a carbon-carbon double bond; and each of $R^3$, $R^4$, and $R^5$ is hydrogen.

7. A compound according to claim 1 wherein $R^1$ is an oxygen atom; $R^2$ is the group

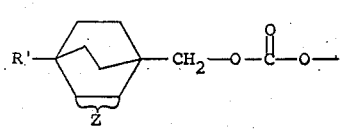

in which R' is hydrogen; Z is a carbon-carbon single bond; and each of $R^3$, $R^4$, and $R^5$ is hydrogen.

8. A compound according to claim 1 wherein $R^1$ is an oxygen atom; $R^2$ is the group

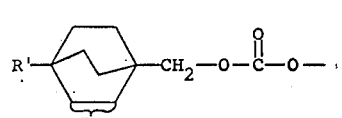

in which R' is methyl; Z is a carbon-carbon single bond; and each of $R^3$, $R^4$, and $R^5$ is hydrogen.

9. A compound according to claim 1 wherein R¹ is an oxygen atom; R² is the group

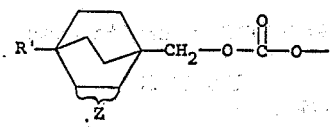

in which R' is hydrogen; Z is a carbon-carbon double bond; and each of R³, R⁴, and R⁵ is hydrogen.

10. A compound according to claim 1 wherein R¹ is an oxygen atom; R² is the group

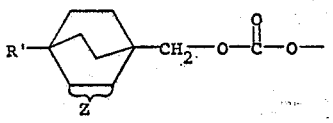

in which R' is methyl; Z is a carbon-carbon double bond; and each of R³, R⁴, and R⁵ is hydrogen.

11. A compound according to claim 1 wherein R¹ is an oxygen atom; R² is the group

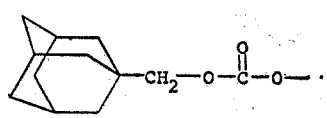

and each of R³, R⁴, and R⁵ is hydrogen.

12. Compounds according to claim 1 wherein R¹ is the group

in which R⁶ is one of said polycyclic groups; R² is hydroxy or acetoxy; R³ is hydrogen, methyl or chloro; R⁴ is hydrogen or methyl; and R⁵ is hydrogen or methyl.

13. A compound according to claim 1 wherein R¹ is the group

in which R⁶ is the group

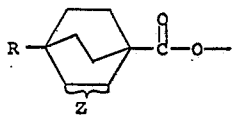

in which R is hydrogen; and Z is a carbon-carbon single bond; R² is hydroxy; and each of R³, R⁴, and R⁵ is hydrogen.

14. A compound according to claim 1 wherein R¹ is the group

in which R⁶ is the group

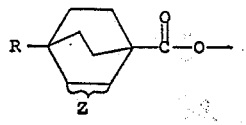

in which R is methyl; and Z is a carbon-carbon single bond; R² is hydroxy; and each of R³, R⁴, and R⁵ is hydrogen.

15. A compound according to claim 1 wherein R¹ is the group

in which R⁶ is the group

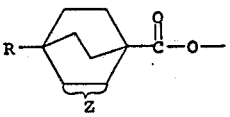

in which R is hydrogen; and Z is a carbon-carbon double bond; R² is hydroxy; and each of R³, R⁴, and R⁵ is hydrogen.

16. A compound according to claim 1 wherein R¹ is the group

in which R⁶ is the group

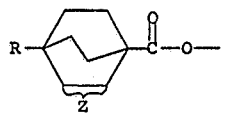

in which R is methyl; and Z is a carbon-carbon double bond; R² is hydroxy; and each of R³, R⁴, and R⁵ is hydrogen.

17. A compound according to claim 1 wherein R¹ is the group

in which R⁶ is the group

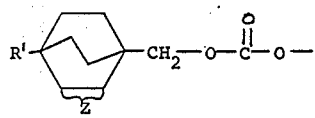

in which R' is hydrogen; and Z is a carbon-carbon single bond; R² is hydroxy; and each of R³, R⁴, and R⁵ is hydrogen.

18. A compound according to claim 1 wherein R¹ is the group

in which R⁶ is the group

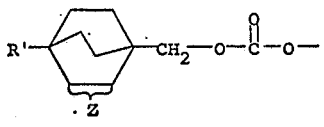

in which R' is methyl; and Z is a carbon-carbon single bond; R² is hydroxy; and each of R³, R⁴, and R⁵ is hydrogen.

19. A compound according to claim 1 wherein R¹ is the group

in which R⁶ is the group

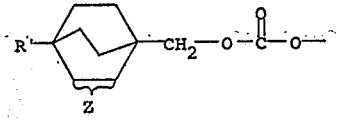

in which R' is hydrogen; and Z is a carbon-carbon double bond; R² is hydroxy; and each of R³, R⁴, and R⁵ is hydrogen.

20. A compound according to claim 1 wherein R¹ is the group

in which R⁶ is the group

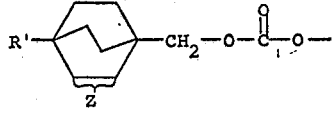

in which R' is methyl; and Z is a carbon-carbon double bond; R² is hydroxy; and each of R³, R⁴, and R⁵ is hydrogen.

21. A compound according to claim 1 wherein $R^1$ is the group
in which $R^6$ is the group
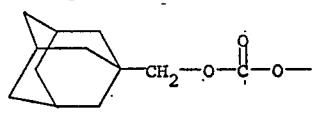
and $R^2$ is hydroxy; and each of $R^3$, $R^4$, and $R^5$ is hydrogen.
No references cited.
ELBERT L. ROBERTS, Primary Examiner
U.S. Cl. X.R.
260—397.5, 999

UNITED STATES PATENT OFFICE
CERTIFICATE OF CORRECTION

Patent No. 3,481,957          Dated December 2, 1969

Inventor(s) Alexander D. Cross and John H. Fried

It is certified that error appears in the above-identified patent and that said Letters Patent are hereby corrected as shown below:

Column 2, line 17, "terms" should read --term--.

Column 3, after the formulas, insert the following line as line 56 --wherein, in each formula each of R, R', $R^1$, $R^2$, $R^3$, $R^4$,--.

Column 6, line 1, "19-nor-$\Delta^4$androstanes" should read --19-nor-$\Delta^4$-androstanes--.

Column 7, line 16, "yloxy-androst" should read --yloxyandrost--.

Column 10, line 30, "0°.5" should read --0.5--.

Column 10, line 39, "chloroethynyl-androsta" should read --chloroethynylandrosta--.

Column 10, line 70, "mixtures" should read --mixture--.

Column 11, line 18, "3α" should read --3β--.

SIGNED AND
SEALED

JUN 30 1970

(SEAL)
Attest:

Edward M. Fletcher, Jr.
Attesting Officer

WILLIAM E. SCHUYLER, JR.
Commissioner of Patents